United States Patent [19]

Corcoran et al.

[11] Patent Number: 5,293,251
[45] Date of Patent: Mar. 8, 1994

[54] ENCODING/DECODING SYSTEM WITH TWO-STAGES OF ENCODING/DECODING

[75] Inventors: Franklin L. Corcoran, Rockville; Spiros Dimolitsas, Gaithersburg, both of Md.

[73] Assignee: Comsat Corporation, Bethesda, Md.

[21] Appl. No.: 786,210

[22] Filed: Oct. 31, 1991

[51] Int. Cl.⁵ .............................................. H04N 1/40
[52] U.S. Cl. .................................. 358/426; 358/261.1
[58] Field of Search ..................... 358/261.1–261.3, 358/262.1, 426–427; 382/56

[56] References Cited

U.S. PATENT DOCUMENTS

| | | | |
|---|---|---|---|
| 3,909,514 | 9/1975 | Tanaka et al. | 178/6 |
| 3,991,267 | 11/1976 | Beaudette | 178/6 |
| 4,040,093 | 8/1977 | Nakagome et al. | 358/261 |
| 4,115,815 | 9/1978 | Nakagome et al. | 358/260 |
| 4,117,517 | 9/1978 | Shintani et al. | 358/260 |
| 4,121,258 | 10/1978 | Nakagome et al. | 358/260 |
| 4,134,133 | 1/1979 | Teramura et al. | 358/261 |
| 4,163,260 | 7/1979 | Hisao et al. | 358/261.3 |
| 4,212,035 | 7/1980 | Nakagome et al. | 358/260 |
| 4,212,036 | 7/1980 | Nakagome et al. | 358/260 |
| 4,245,247 | 1/1981 | Fike et al. | 358/128.6 |
| 4,360,840 | 11/1982 | Wolfrum et al. | 358/261 |
| 4,558,371 | 12/1985 | Rallapalli et al. | 358/261 |
| 4,794,461 | 12/1988 | Roberts et al. | 358/261.3 |
| 4,796,092 | 1/1989 | Ogata | 358/261.1 |
| 4,893,187 | 1/1990 | Tsujimoto et al. | 358/261.1 |

*Primary Examiner*—Stephen Brinich
*Attorney, Agent, or Firm*—Sughrue, Mion, Zinn, Macpeak & Seas

[57] ABSTRACT

A compression and decompression system for transmitting facsimile images in which the facsimile image is compressed in a vertical and a horizontal direction. The compressed facsimile image is decompressed by selecting a reference bit in the decompressed facsimile image and expanding the bit in a vertical and a horizontal direction in accordance with a binary value of bits near the selected reference bit.

9 Claims, 3 Drawing Sheets

ENCODING/DECODING SYSTEM WITH TWO-STAGES OF ENCODING/DECODING

FIELD OF THE INVENTION

The present invention relates to systems for compressing and decompressing facsimile images transmitted over satellite communications.

BACKGROUND OF THE INVENTION

The emergining use of low-rate coding and digital transmission in mobile satellite communications and the increasing use of facsimile services have identified the desirability for visual service transparency over the same very narrow-band circuits. The economic viability of such a service, however, rests on the capability of introducing further image message compression, either in real-time or off-line (in store and forward). In addition to the economic side however, long document transmission times negatively impact the customer perceived quality of service in that, over narrow-band circuits, several minutes might be required for the transmission of documents that would normally need only seconds when transmitted through the public switch telephone network. In order to achieve these objectives, some form of image compression over and above what is provided by traditional Group 3 facsimile is needed.

Generally, this compression can only be achieved at the expense of message quality. However, since these types of services are not typically offered over the public switched telephone network, considerable leeway is available for techniques that primarily focus on the retention of a high degree of message intelligibility over a narrower range of input documents, rather than attempting to achieve the broader scope of preserving quality over a very wide range of possible images.

The following are examples of facsimile compression and decompression systems.

U.S. Pat. No. 4,796,092 to Ogata discloses an image processing system for facsimile devices which electrically transmit image data. According to this system, an image signal is coded using run length coding, and then the coded image signal is stored in an image memory. The coded signal is then read out from the image memory and processed a plurality of times.

U.S. Pat. No. 4,794,461 to Roberts et al discloses a compression system for facsimile image data. The system includes block coding one or more vertical mode codes produced by standard CCITT facsimile processes.

U.S. Pat. No. 4,134,133 to Teramura et al discloses a system for interline-coding a facsimile signal. The system includes alternately dividing information of scanning lines of an input facsimile signal.

U.S. Pat. No. 4,558,371 to Rallapalli et al discloses a system for two-dimensionally coding digital facsimile signals. The system includes coding the positions of the color change picture elements in a coding line of digitized picture data with respect to the position of change picture elements in a reference line of digitized picture data.

U.S. Pat. No. 4,115,815 to Nakagome et al discloses a facsimile signal coding method in which information change picture elements are classified into two kinds of change points according to the information change directions.

U.S. Pat. No. 4,040,093 to Nakagome et al discloses a system for coding information change picture elements in a facsimile signal in which the information change picture elements of consecutive scan lines are examined in order to minimize the number of bits of each code word.

U.S. Pat. No. 4,360,840 to Wolfrum et al discloses a real time data compression scheme for facsimile transmission systems. The scheme includes compressing a graphic image using an entropy preserving algorithm which allows for real time reduction of pel-to-pel data.

U.S. Pat. No. 3,991,267 to Beaudette discloses a method for producing compressed digital data in which binary line scan functions are translated into equivalent binary codes of reduced redundancy and length.

U.S. Pat. No. 3,909,514 to Tanaka et al discloses a facsimile communication system in which code signals are generated which indicate a sequence of background area. These code signals are subsequently used to regenerate the original image.

U.S. Pat. No. 4,117,517 to Shintani et al discloses a data compression system for binary facsimile signals. In this system, the binary bit pattern of each scan line is compared with that of the adjacent scan line just above it, and any bit pattern variations are identified as belonging to one of several predetermined modes which are translated into codes. These codes are transmitted instead of the image in order to provide image compression. Those variations which do not belong to any of the predetermined modes are transmitted uncoded.

U.S. Pat. No. 4,121,258 discloses a method for coding facsimile signals in which addresses of information change elements, each having information different from the immediately preceding picture element on the same scanning line of a facsimile signal, are encoded.

U.S. Pat. No. 4,212,035 to Nakagome et al discloses a facsimile signal coding system in which a facsimile signal is divided into a plurality of scanning line groups. A central one of the scanning lines of each group is encoded by a coding method which does not refer to information of a scanning line adjacent to the central scanning line.

U.S. Pat. No. 4,893,187 to Tsujimoto et al discloses an image processing apparatus which includes an exclusive OR processing circuit for carrying out an exclusive OR operation on pairs of read image lines.

U.S. Pat. No. 4,163,260 to Hisao et al discloses a system for compressing band width of an image by logically combining each picture element on at least two scan lines to form two sections, and run length-coding one of the two sections.

U.S. Patent to Yamazaki et al discloses a coding method for two-dimensional coding of a two-level facsimile signal.

U.S. Pat. No. 4,212,036 to Nakagome et al discloses a method for coding addresses of information change picture elements.

U.S. Pat. No. 4,245,247 to Fike et al discloses a system for recording facsimile on a video disc.

SUMMARY OF THE INVENTION

The present invention relates to systems developed in order to reduce the transmission requirements of facsimile images while maintaining high intelligibility in mobile communications environments.

The systems according to the invention focus on the implementation of a low-cost facsimile interface unit (FIU) of the type disclosed in U.S. patent applications Ser. Nos. 07/720,990 and 07/754,785 which is suitable for facsimile communication between low-power mobile earth stations and fixed earth stations for both point-to-point and point-to-multipoint transmissions. This interface may (but does not have to) be co-located with the transmitting facsimile terminal equipment and functions in conjunction with standard Group 3 facsimile terminals. The actual systems used are based on the interception and store-and-forwarding of facsimile images. However, one set of the methods developed operates on a small number of scan lines, thus lending itself to potential real-time operation over satellite channel rates ranging from 2400 bit/s to 800 bit/s, for user-to-interface transmission rates of 9600 bit/s to 2400 bit/s respectively.

The systems according to the invention are capable of achieving a compression of approximately 32 to 1 (with error protection) when compared with the original (uncoded image) and are designed to emphasize the intelligibility retention of hand-written images. These systems offer high reconstruction intelligibility and only little additional quality degradation when compared with standard resolution facsimile coding, which only offers compression ratios of the order of 12 to 1.

The basic idea behind the compression methods of the invention is the selective removal of pixel information from an intercepted document that is being transmitted using the CCITT Recommendation T.4 run-length coding (RLC). Subsequently the resulting image is encoded using optimized RLC prior to transmission over the digital channel. The pixel removing process makes it possible to transform non-linearly the probability density function (pdf) of the "run-lengths" by decreasing the width of the density peak (a critical characteristic of the "run-lengths" used to derive the T.4 RLC code). This narrowing of the pdf peak permits in turn the re-optimization and development of more efficient run-length coding, thereby reducing transmission capacity requirements.

Accordingly, the present invention relates to methods and systems that further compress facsimile images, and provide the following advantages relative to known facsimile compression systems:

a) The invention is designed to interwork with group 3 facsimile and as a consequence successfully concatenate with the run-length coding defined in CCITT recommendation T.4;

b) The invention is compatible with standard group 3 customer premises equipment in a transparent manner, with no need for further modifications. Other facsimile encoding techniques require access to the customer premises equipment (i.e., require non-standard equipment) and fully replace the run-length coding used by group 3 facsimile terminals.

c) The invention operates to first preserve message intelligibility and then retain as much image quality as possible. This objective is different from other facsimile encoding techniques developed for PSTN applications which only address received message quality.

The invention is also highly suitable for mobile satellite applications and for a second generation (or optional) INMARSAT Std.-M and -B facsimile services, which support real-time facsimile message transmission.

DESCRIPTION OF THE PREFERRED EMBODIMENTS

Before addressing in detail the methods and systems according to the invention, it is first necessary to define the images to be processed.

The notation $b(l,p,s)$ denotes the $s^{th}$ picture element (or pixel) of the $p^{th}$ picture element octet of the $l^{th}$ scan-line of a bit-image file. It is assumed that one bit is allocated for describing each pixel, so that an isomorphic mapping is defined between the set of pixels (white, black)3 $b(l,p,s)$ and the binary set of numbers (1, 0). This mapping is defined so that:

$b(l,p,s) = 0$ when the relevant pixel is black; and
$b(l,p,s) = 1$ when the relevant pixel is white.

By definition of the variables l, p, s, it is seen that $\{1,2, \ldots, 8\}$ 3 s; $P_{max} S_{max}$=number of horizontal pixels along a scan-line; and $l_{max}p_{max}$=number of scan-lines across a bit-image file. In view of the isomorphism between the set of pixels along a scan-line and the sequence of binary bits, the terms bit and pixel will be used interchangeably to denote either the color or the assigned value of the relevant picture element.

It is also necessary to define operations on a byte-level (octet basis). Using a similar notation as above, b (1, p) can be used to denote the $p^{th}$ byte (octet) of the $l^{th}$ scan-line where $b(l,p) = U^s b(l,p,s)$ where $U^s$ denotes the union operator operating in the s-tuple of bits. With s=8, the range of values of b(l,p) is now the set of binary values {00000000,00000001,0000010...11111111} comprising $2^8$, or 256 members. Finally, when operations need to be defined in terms of scan-line operations, b(l) can be used to denote the entire $l^{th}$ scan-line so that $b(l) = U^p U^s$ b (1, p, s), where $U^p U^s$ denotes the union operator operating in the p.s-tuple of bits (the range of values of b (1) comprises a binary set with $2^{1728}$ members). In describing the present invention, other pixels combination definitions will be introduced, as appropriate.

The first embodiment of the invention relates to an encoding or compressing system which uses a scan line reduction process based upon the maximization of content differences (on a byte-by-byte basis) of vertically adjacent bit-image scan-lines. This yields a first stage 2-to-1 line compression along the vertical dimension. The encoding system according to this embodiment also includes a second stage of vertical reduction which is concatenated with the first one. This second stage is designed to perform a bit-wise-logical OR operation between pairs of vertically adjacent lines (as derived from the first stage of vertical compression), thereby reducing the overall number of lines requiring coding (after two compression stages) by a factor of 4-to-1 when compared to the uncoding bit-image.

The basic two-stage vertically compressing system according to the first embodiment is subsequently complemented by a horizontal bit-reduction process to yield a total reduction of 16-to-1 in the number of bits of the resulting bit-map (as compared with the uncoded bit-image). At the decoder stage of the system which is discussed in detail below, a reconstruction process is employed which utilizes information in the neighborhood of the decoded pixels to fill-in, i.e., reconstruct, the missing lines, with as much fidelity to the original document as possible.

Figure 1:
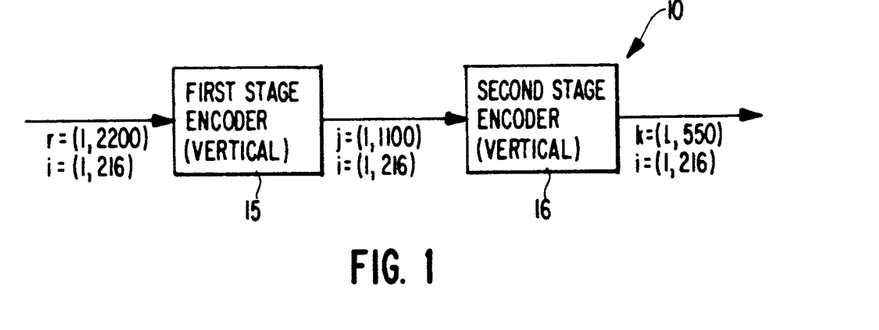
FIG. 1 is a block diagram of a vertical compression system according to a first embodiment of the invention.

FIG. 1 shows the vertical encoding or compressing system 10 according to the first embodiment. As shown in FIG. 1, the system 10 includes a first stage encoder 15 for receiving bit-image scan lines from the original image file, and a second stage encoder 16 connected to receive the output from the first stage encoder 15. In FIG. 1, reference letter r, j and k denote the number of lines, and the letter i denotes the number of bytes of the image.

The first stage encoder 15 initially receives three bit-image scan-lines from the original image file, from which the first line is defined as a reference scan-line. Subsequently, one byte at a time is sequentially read along the reference scan line and compared with each of the two bytes vertically adjacent to it and taken from the next two lower scan-lines. The byte from the reference line may be denoted b(p,i) where p indicates the reference line number and i the serial position of the byte. Then this byte is compared with bytes b(r+1,i) and b(r+2,i) where r+1 is the scan-line immediately below the reference scan line, and r+2 is the scan-line immediately below scan line r+1 (in this case p=r). Bytes b(r+1,i) and b(r+2,i) are then compared to byte b(p,i) and the byte which differs the most from the references one is selected and placed in an output scan-line as byte b(j,i). Therefore, $$b(j,i) = b(r+1,i), \text{ if}$$

$$\sum_{s=1}^{8} |b(p,i,s) - b(r+1,i,s)| > \sum_{s=1}^{8} |b(p,i,s) - b(r+2,i,s)|;$$

or $$b(j,i) = b(r+2,i) \text{ if}$$

$$\sum_{s=1}^{8} |b(p,i,s) - b(r+1,i,s)| < \sum_{s=1}^{8} |b(p,i,s) - b(r+2,i,s)|$$

where r=1,2,3, . . . ,2200; j=1,2,3, . . . ,1100; and b(p+1,i)=b(j,i).

Thus, the first stage encoder 15 operates to ignore one byte every time the index s is incremented and, as a result, one output scan-line is generated for every pair of scan-lines used as input to this process. If both b(r+1i) and b(r+2, i) qualify for selection, meaning that $$\sum_{s=1}^{8} |b(p,i,s) - b(r+1,i,s)| = \sum_{s=1}^{8} |b(p,i,s) - b(r+2,i,s)|,$$

then the byte having the greatest number of internal bit transitions (i.e. maximum number of run-lengths) is selected for the i byte position in the generated output scan-line.

Thus if, $$\sum_{s=1}^{7} |b(r+1,i,s) - b(r+1,i,s+1)| \geq \sum_{s=1}^{7} |b(r+2,i,s) - b(r+2,i,s+1)|,$$

then $b(j,i) = b(r+1,i)$, otherwise $b(j,i) = b(r+2,i)$.

As each new output scan-line b(j) is being created it becomes the reference line b(p+1) for subsequent comparisons with the next two scan lines, i.e., scan line j becomes the reference line p+1 for comparison with lines r+3 and r+4. At the end of the bit-image file the last scan-line is repeated once in order to complete the reduction process with the correct number of scan-lines (i.e., one-half the original number). As shown in FIG. 1, the output of the first stage encoder 15 includes lines 1 through 1100, i.e., j=[1,1100] which is one-half the number of scan-lines inputted to the first stage encoder 15, i.e., r=[1,2200].

The second stage encoder 16 receives the 2-to-1 scan-line reduced image output from the first stage encoder 15 and serves to provide an additional 2-to-1 scan-line reduction by performing a bit-wise-logical OR operation on consecutive, non-overlapping line pairs. For example, if b(j,i) and b(j+1,i) denote vertically adjacent (consecutive) scan-line bytes output from the first stage encoder 15, then the second stage encoder 16 produces a new sequence of bytes b(k,i) so that:

$$b(k, i) = U^s \{b(j, i, s) \oplus b(j+1, i, s)\}$$

where i=1, 2 ... 216; s=1,2,3, ... ,8; k=1,2,3, ... ,550; and i=1,2,3 ... 1100 and $\oplus$ denotes the logical OR operator.

Consequently, the combination of the first and second encoders 15 and 16 provide an output bit-image in which the number pixels along the horizontal scan-line direction of the bit-image is preserved, i.e., i=[1,216], but compositely reduces the number of scan-lines by a factor of 4-to-1 when compared with the original image file, i.e., k=[1,550] compared with r=[1,2200].

In contrast to the vertical encoding system 10 described above which operates in the vertical direction, the horizontal encoding or compression system according to the first embodiment of the invention provides for a composite 4-to-1 reduction in the number of pixels (bits) along a document's horizontal direction.

Figure 2:
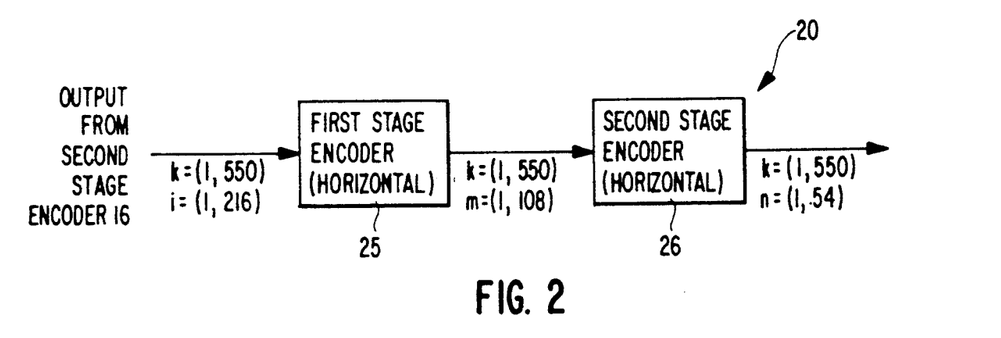
FIG. 2 is a block diagram of a horizontal compression system according to a first embodiment of the invention.

FIG. 2 shows the horizontal encoding or compressing system 20 according to the first embodiment of the invention. As shown in FIG. 2, system 20 includes a first stage horizontal encoder 25 which is connected to receive the output of the second stage vertical encoder 16 (FIG. 1), and a second stage horizontal encoder 26 which is connected to receive the output from the first stage horizontal encoder 25.

The first stage encoder 25 receives the bit-image file generated by the vertical encoding system 10 and consecutively disregards even-numbered pixels (bits) from odd-numbered scan-lines and odd-numbered pixels from even-numbered lines. Thus, if b(k,m,s) denotes the $s^{th}$ pixel of the $k^{th}$ output scan-line's $m^{th}$ byte, then:

$b(k,m,s+1)=b(k,i,2s+1)$, when $k=$odd and $s=0,1,2,3$; or $b(k,m,s+1)=b(k,i+1,,2s-7)$ when $k=$odd and $s=4,5,6,7$; and $b(k,m,s+1)=b(k,i,2s+2)$ when $k=$even and $s=0,1,2,3$; or $b(k,m,s+1)=b(k,i+1,,2s-6)$ when $k=$even and $s=4,5,6,7$;

where $j=1,2,3,\ldots,216$; $m=1,2,3,\ldots 108$; and $k=1,2,3\ldots 550$. Consequently, in effect, the first stage encoder 25 retains alternate bits from each scan-line in a "dithering-like" fashion.

The second stage encoder 26 of the horizontal encoding system 20 receives the bit-image output from the first stage encoder 25 and provides an additional 2-to-1 horizontal bit-reduction gain. This is accomplished by a bit-wise-logical OR operation of consecutive non-overlapping pairs of bits (pixels) along a scan-line similar to the operation of the second stage encoder 16 of the vertical compression system 10. The operation of encoder 26 can be expressed as:

$b(k,n,s+1)=b(k,m,2s+1) \oplus b(k,m,2s+2)$ when $s=0,1,2,3$; or $b(k,n,s+1)=b(k,m+1,2s-7) \oplus b(k,m+1,2s-6)$ when $s=4,5,6,7$;

where $k=1,2,3,\ldots,550$; $m=1,2,3,\ldots,108$; and $n=1,2,3,\ldots,54$.

Thus, the horizontal encoding or compression system 20 serves to reduce the number of bits in an image file by a factor of 4-to-1.

Figure 3:
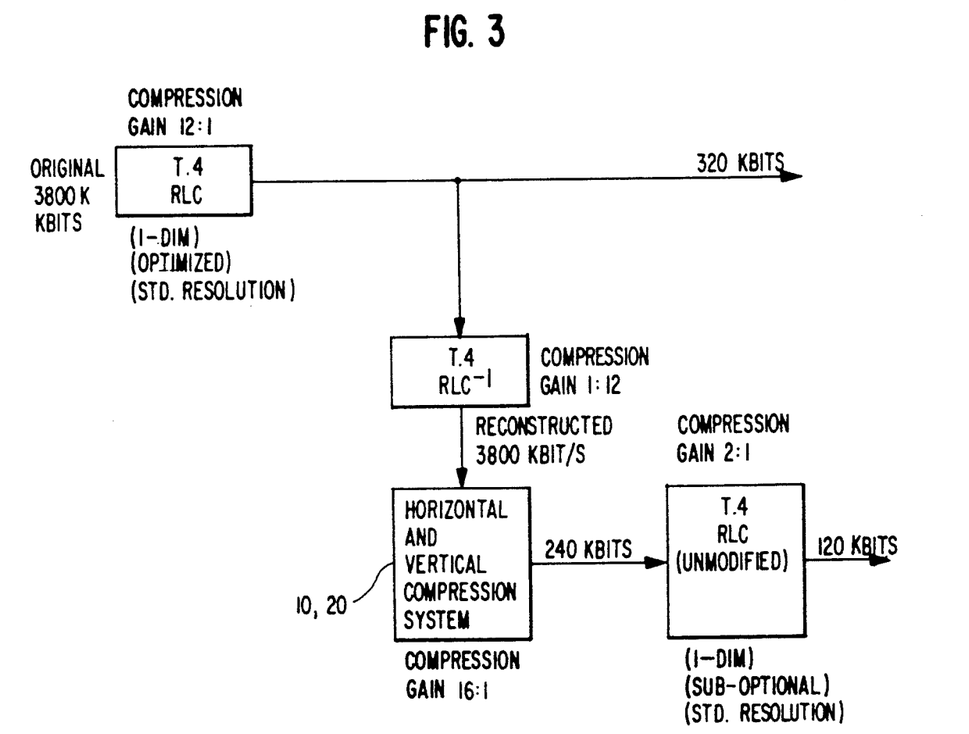
FIG. 3 is a block diagram for illustrating how the horizontal and vertical compression systems according to the invention can be interfaced or integrated with a T.4 run-length encoding scheme.

Once the image has been pixel reduced to $1/16^{th}$ of its original size by the vertical and horizontal encoding or compression systems 10 and 20, T.4 run-length encoding can be applied as shown in FIG. 3. Specifically, as shown in FIG. 3, the horizontal and vertical encoding or compression systems 10 and 20 are connected to receive the reconstructed original image and the T.4 run-length encoding system 28 is connected to receive the output of systems 10, 20. Because, however, the T-4 code was not reoptimized the additional compression attained in this manner is only equal to 2, thus resulting in a total overall compression of approximately 32-to-1. This final reduction corresponds to a transmitted bit count which is approximately one-third that of a standard resolution fax message.

The second embodiment of the invention relates to an encoding system which is based on the pixel removing principle used in the first embodiment, and employs a decoding system discussed below. However, at the encoder of the second embodiment a recursive analysis-by-synthesis process is used with the objective of minimizing the resulting reconstruction error at the decoder. Although the second embodiment is more complex than the first embodiment, the second embodiment provides higher compression performance and improved transmission quality. However, because of the recursive nature of the process it may be limited (in practical implementations) to store-and-forward operation.

Figure 4:
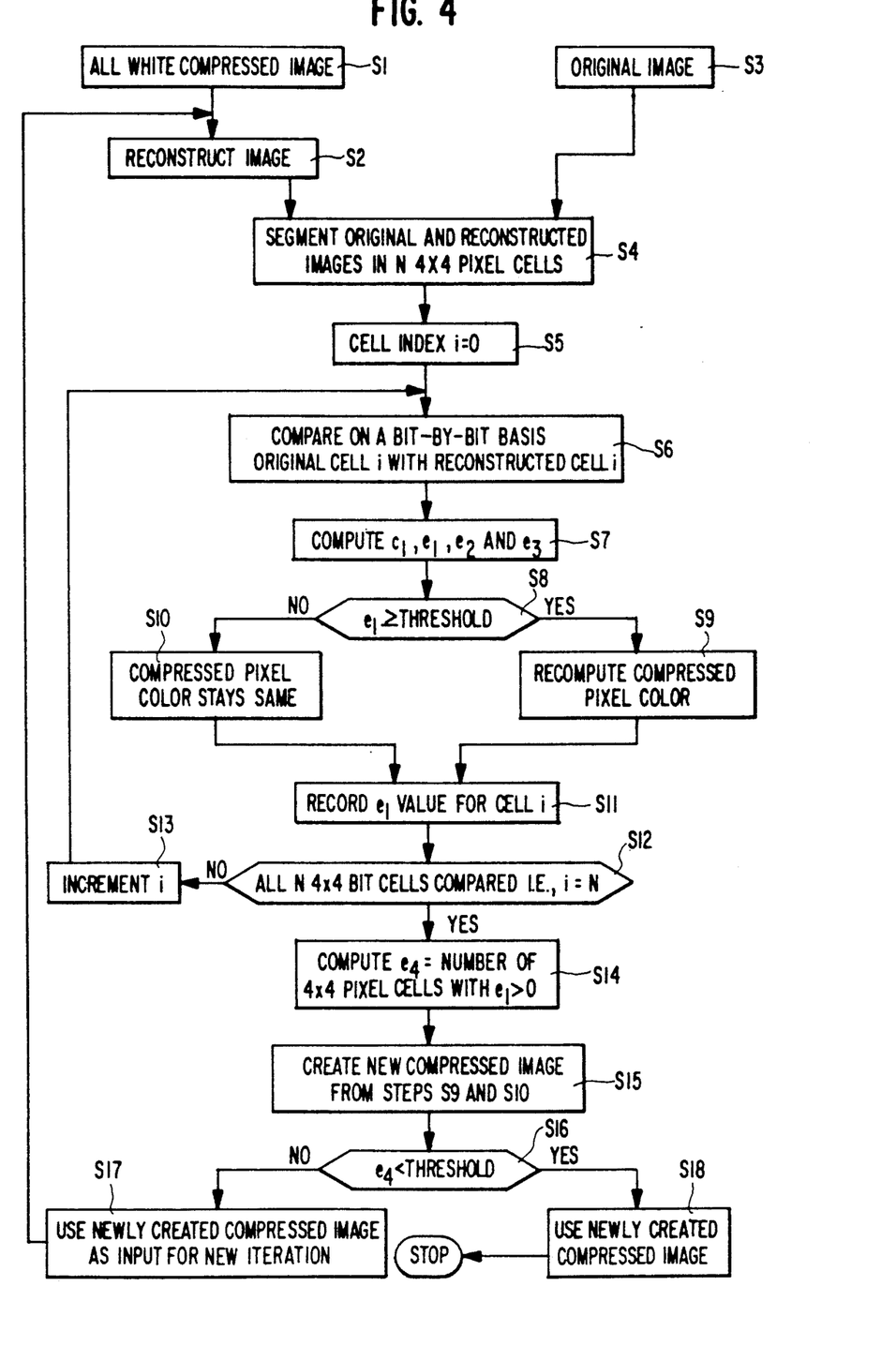
FIG. 4 is a flow chart for describing the operation of a compression system according to a second embodiment of the invention.

The operation of the encoding system according to the second embodiment is detailed in the flow chart of FIG. 4. The analysis-by-synthesis encoder initially creates a white (all binary one) page (Si) equal in size to the normalized input (original) document (S3) for use as the primary reconstructed document (S2), and a white (all binary one) compressed page for use as the primary bit-reduced document. The system then inputs four scan-lines at a time (S4) from the reconstructed document for comparison (S6) with the an equal number of lines from the original data file. This comparison (S6) is done within a 4-bit-by-4 bit cell centered around the corresponding (reference) picture element (data bit) from the bit-reduced document file. At each iteration (S5), a new compressed data file is created according to the method.

Let $b(n,i,s)$ and $b'(n,i,s)$ denote the $S^{th}$ bit of the $i^{th}$ byte of the $n^{th}$ scan-line of the input (source) and reconstructed image files respectively and let $|_Q$ denote the $Q^{th}$ iteration. Then:

First, the number $c_1$ of binary '1's in the input (source) data cell, the number of total errors $e_1$ between the source data cell and the reconstructed data cell, the number $e_2$ of binary '1's in error in reconstructed data cell, and finally the number $e_3$ of binary '1's that are correct in the reconstructed data cell are computed (S7). This can be expressed as:

$$c_1 = \sum_{n=N}^{N+3} \sum_{s=S}^{S+3} b(n,i,s);$$

$$e_1 = \sum_{n=N}^{N+3} \sum_{s=S}^{S+3} |b(n,i,s) - b'(n,i,s)|;$$

$$e_2 = \sum_{n=N}^{N+3} \sum_{s=S}^{S+3} |b(n,i,s) - b'(n,i,s)|;$$

$b'(n,i,s) \neq 0$ $$e_3 = \left[\sum_{n=N}^{N+3} \sum_{s=S}^{S+3} b'(n,i,s)\right] - e_2;$$

where $\{1,5\}$ S, $\{1,2,\ldots,2197\}$ N, and $\{1,2,\ldots,216\}$ i

When a cell's total number of errors $e_1$ is greater-than or equal to a threshold (S8) (the threshold is equal to 0 when $Q=1$ and equal to 8 when $Q>1$); and if the number of binary '1's that are correct, plus the number of binary '0's that should have been equal to binary '1's in the reconstructed data cell is the greater-than or equal to 4 when $Q=1$ (and equal to 8 when $Q>1$), the new compressed reference data bit is set equal to binary '1' (S9). In addition, if the compressed data bit is changed from a '0' to a '1' because of this process, the total number of errors cells in error $e_4$ is incremented by one. Thus, if $e_1|_Q \geq 8$, $(e_1|_1 \geq 0,)$ and if $p=e_3+(e_1=e_2)$ and $p_Q \geq 8$ (or $p_1 \geq 4$), then $b(1,j,s)_Q=1$. However, if $b(1,j,s)_{Q-1}=0$; then $e_{4Q+1}=1+e_{4Q}$, where $\{1, 5\}3$ S, $\{1,2,3\ldots,216\}3i$, $\{1,2,\ldots 2197\}3N$, $\{1,2,\ldots,550\}3l$, and $\{1,2,\ldots,54\}3j$.

When a cell's total number of errors $e_1$ is greater-than or equal to a threshold (S8) (the threshold is equal to 0 when $Q=1$ and equal to 8 when $Q>1$); and if number of binary '0's that are correct added to the number of binary '1's that should have been equal to binary '0's in the reconstructed data cell is greater-than or equal to 4 when $Q=1$ (and equal to 8 when $Q>1$), the new compressed (reference) data bit is set equal to binary '0' (S9). In addition, if the compressed data bit is changed from a '1' to a '0' the total number of errors $e_4$ is incremented. Thus, if $e_1|_Q \geq 8$, $(e_1|_1 \geq 0)$ and if $q=(16-e_3-e_1)+e_2=16-e_2-e_1+e_2$ and $q|_Q > 8$ (or $q|_1 \geq 4$), then $b(l,j,s)|_Q = 0$. However, if $b(1,j,s)|_{Q-1} = 1$, then $e_4|_{Q+1} = 1 + e_4|_Q$, where $\{1, 5\}3$ S, $\{1,2,3,\ldots,216\}3i$, $\{1,2,\ldots,2197\}3N$, $\{1,2,\ldots,550\}3$ l, and $\{1,2,\ldots,54\}3j$.

When a cell's total number of errors $e_1$ is less-than a threshold (S8) (the threshold is equal to 0 when $Q=1$ and equal to 8 when $Q \geq 1$); then the new compressed (reference) data bit remains unchanged (S10). Thus, if $e_1|_Q \leq 8$ ($e_1|_1 = 0$) then $b(1,j,s)|_Q = b(l,j,s)|_{Q-1}$, where $\{1,2,\ldots,8\}3s$, $[1,2,\ldots,550]31$, and $\{1,2,\ldots,54\}3j$.

The steps (S7–S10) are performed irrespective of the number of binary '1's in the source cell. This parameter, however, could become part of the decision process for future enhancements of the present algorithm.

The process is performed for all $(1728 \times 2200/16)$ possible bit-image cells of the normalized input source page and, at each iteration, a new set of compressed and reconstructed data files are produced. (S11–S13). The reconstructed file is obtained from the compressed file using the decoder described below. This iterative process is continued until the total number of cells $e_4$ with an error count $e_1 > 0$ are reduced to less than 0.1% of the cells with $e_1 > 0$ during the first iteration of the process (S14–S18). Thus, the iterative coding process is terminated at the $Q^{th}$ iteration when $e_4|_Q \leq 0.001\ e_4|_1$.

Figure 5:
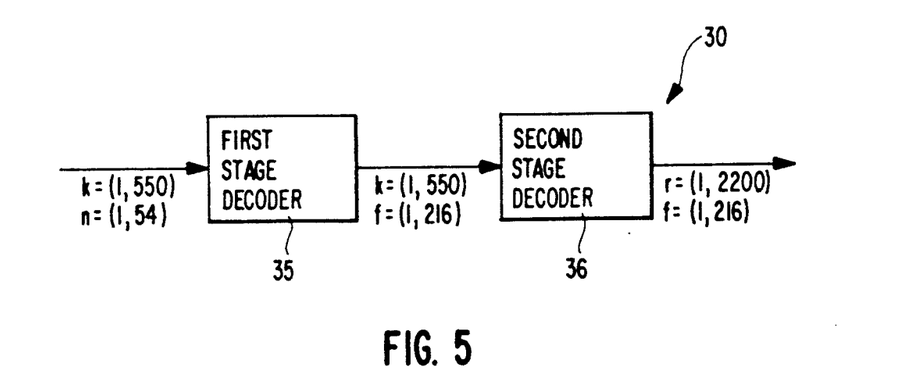
FIG. 5 is a block diagram of a decoding system according to a third embodiment of the invention.

The third embodiment of the invention relates to a decoding or decompressing system and is shown in FIG. 5. As shown in FIG. 5, the decoding system 30 includes a first stage decoder 35 which receives the encoded image, and a second stage decoder 36 which is connected to receive the output from the first stage decoder 35. The first stage decoder 35 initially reads three scan-lines from the compressed data file transmitted over the communications channel and expands the data along the horizontal direction using a decision scheme whose outcome is dependent upon the input data according to the following process:

Assuming that all pixel replacement decisions are made with respect to a reference pixel (or bit) $b(k, n, s)$, then:

When the reference bit is a '1', and the bits on either side of it are both '0', then the output scan-line is horizontally expanded to the binary sequence '1111'. Hence, if $b(k,n,s) = 1$ and $b(k,n,s-1) = b(k,n,s+1) = 0$, (where $K = 1,2,\ldots,550$; $n = 1,2,\ldots,54$, and $s = 1,2,\ldots 8$)

then
$U^q\{b(k,f,q)\} = 1111$,
when
$s = 1,3,5,$ or 7; $q = 1,2,3,4$; and $f = (4n - 3) + (s - 1)/2$;
or
$U^q\{b(k,f,q)\} = 1111$,
when
$s = 2,4,6,$ or 8; $f = (4n - 3) + (s - 2)/2$.

When the reference bit is a '1', and the bit to its left is a '1' and the bit to its right is a '0'; then if either the bit above it and to its right is a '1', or the bit below it and to its right is a '1', or the bits directly above and below it are both '1', then the output scan-line is horizontally expanded to the binary sequence '1111'. Otherwise the output scan-line is horizontally expanded to the binary sequence '1100'. Thus, if $b(k,n,s) = 1$ is the reference bit, and $b(k,n,s-1) = 1$ and $b(k,n,s+1) = 0$;

then, if $b(k - 1,n,s + 1) = 1$;
or if $b(k + 1,n,s + 1) = 1$;
or if $b(k + 1,n,s) = b(k - 1,n,s) = 1$;
then, when $s = 1,3,5,$ or 7, -continued
$U^q\{b(k,f,q)\} = 1111$
where $q = 1,2,3,4$; and $f = (4n - 3) + (s - 1)/2$.
or, when $s = 2,4,6,$ or 8,
$U^q\{b(k,f,q)\} = 1111$
where $q = 5,6,7,8$; and $f = (4n - 3) + (s - 2)/2$.
Otherwise,
when $s = 1,3,5,$ or 7,
$U^q\{b(k,f,q)\} = 1100$
where $q = 1,2,3,4$; and $f = (4n - 3) + (s - 1)/2$.
or, when $s = 2,4,6,$ or 8,
$U^q\{b(k,f,q)\} = 1100$
where $q = 5,6,7,8$; and $f = (4n - 3) + (s - 2)/2$.

When the reference bit is a '1', and the bit to its left is a '0' and the bit to its right is a '1'; then if either the bit above it and to the left is a '1', or the bit below it and to the left is a '1', or the bits directly above and below are both '1', the output scan-line is horizontally expanded to the binary sequence '1111'. Otherwise the output scan-line is horizontally expanded to the binary sequence '0011'. Thus, if $b(k,n,s) = 1$ is the reference bit, and $b(k,n,s-1) = 0$ and $b(k,n,s+1) = 1$ then, if $b(k - 1,n,s - 1) = 1$;
or if $b(k + 1,n,s - 1) = 1$;
or if $b(k - 1,n,s) = b(k + 1,n,s) = 1$;
then, when $s = 1,3,5,$ or 7,
$U^q\{b(k,f,q)\} = 1111$
where $f = (4n - 3) + (s - 1)/2$ and $q = 1,2,3,4$
or, when $s = 2,4,6,$ or 8
$U^q\{b(k,f,q)\} = 1111$
where $f = (4n - 3) + (s - 2)/2$ and $q = 5,6,7,8$.
Otherwise,
when $s = 1,3,5,$ or 7.
$U^q\{b(k,f,q)\} = 0011$
where $f = (4n - 3) + (s - 1)/2$ and $q = 1,2,3,4$.
or, when $s = 2,4,6,$ or 8 and $q = 5,6,7,8$.
$U^q\{b(k,f,q)\} = 0011$
where $f = (4n - 3) + (s - 2)/2$ and $q = 5,6,7,8$.

When the reference bit is a '1', and the bits to either side of it are both '0', then the output scan-line is horizontally expanded to the binary sequence '1111'. Thus if $b(k,n,s) = 1$ is the reference bit, and $b(k,n,s-1) = b(k,n,s+1) = 1$, then when $s = 1,3,5,$ or 7,
$U^q\{b(k,f,q)\} = 1111$
where $f = (4n - 3) + (s - 1)/2$ and $q = 1,2,3,4$;
or, when $s = 2,4,6,$ or 8,
$U^q\{b(k,f,q)\} = 1111$
where $f = (4n - 3) + (s - 1)/2$ and $q = 5,6,7,8$;

Finally, when the reference bit is a '0' then the output scan-line is horizontally expanded to the binary sequence '0000'. Therefore, if $b(k,n,s) = 0$ is the reference bit then, when $s = 1,3,5,$ or 7,
$U^q\{b(k,f,q)\} = 0000$
where $f = (4n - 3) + (s - 1)/2$ and $q = 1,2,3,4$;
or, when $s = 2,4,6,$ or 8,
$U^q\{b(k,f,q)\} = 0000$
where $f = (4n - 3) + (s - 2)/2$ and $q = 5,6,7,8$;

Once the first top three lines are processed in this manner, the first stage decoder 35 receives two new lines at a time for each three scan-line iteration. The last scan-line in a file is finally repeated once, in order to produce the correct number of scan-lines in the output image. Thus, the first stage decoder 35 in effect provides a 4-to-1 expansion of the compressed data along the horizontal dimension so that the output file is returned to the original normalized line length of 1728 picture elements.

The second stage decoder 36 serves to expand the data file along the vertical direction by employing a decision mechanism that is dependent on the input data according to the following process:

When the reference bit is a '1', and the bits directly above and below are both '0', then additional output scan-lines are generated so that, along the vertical direction, a sequence of 4 contiguous picture elements is generated for each reference bit. The set of 4 contiguous picture elements is equal to the binary sequence '1111'. Thus, if b(k,f,q)=1 represents the reference bit and b(k+1,f,q)=b(k−1,f,q) =0, then $U^r\{b(r,f,q)\} = 1111$,
where $r = 4k − 3, 4k − 2, 4k − 1, 4k$.

When the reference bit is a '1', and the bit directly above it is a '1' and the bit directly below it is a '0'; then if either the bit below to its left is a '1'; or the bit below and to its right is a '1', or the bits to its left and right are both '1', the additional scan-lines are generated so that, along the vertical direction, a sequence of 4 contiguous picture elements equal to the binary sequence '1111' is generated for each reference bit. Otherwise, the set of 4 contiguous picture elements generated is equal to the binary sequence '1100'. Thus, if b(k,f,q)=1 is the reference bit, and b(k−1,f,q)=1 and b(k+1,f,q)=0 then if $b(k + 1,f,q − 1) = 1$;
or, if $b(k + 1,f,q + 1) = 0$;
or, if $b(k,f,q + 1) = b(k,f,q − 1) = 1$
then $U^r\{b(r,f,q)\} = 1100$,
where $r = 4k − 3, 4k − 2, 4k − 1, 4k$;
otherwise
$U^r\{b(r,f,q)\} = 1100$,
where $r = 4k − 3, 4k − 2, 4k − 1, 4k$.

When the reference bit is a '1', and the bit directly above it is a '0' and the bit directly below is a '1'; then if either the bit above and to its left is a '1', or the bit above and to its right is a '1', or the bits to its left and right are both '1', the additional scan-lines are generated so that, along the vertical direction, a sequence of 4 contiguous picture elements equal to the binary sequence '1111' is generated for each reference bit. Otherwise, the set of 4 contiguous picture elements generated is equal to the binary sequence '0011'. Thus, if b(k,f,q)=1 is the reference bit, and b(k−1,f,q)=0 and b(k+1,f,q)=1 then if $b(k − 1,f,q − 1) = 1$;
or, if $b(k − 1,f,q + 1) = 1$;
or, if $b(k,f,q + 1) = b(k,f,q − 1) = 1$
then $U^r\{b(r,f,q)\} = 1111$,
where $r = 4k − 3, 4k − 2, 4k − 1, 4k$,
otherwise
$U^r\{b(r,f,q)\} = 0011$,
where $r = 4k − 3, 4k − 2, 4k − 1, 4k$.

When the reference bit is a '1', and the bits directly above and below it are both '1' then additional scan-lines are generated so that, along the vertical direction, a sequence of 4 contiguous picture elements is generated for each reference bit. The set of 4 contiguous picture elements is equal to the binary sequence '1111'. Thus, if b((k,f,q)=1 is the reference bit, and b(k−1,f,q)=b(k+1 f,q)=1, then $U^r\{b(r,f,q)\} = 1111$, where r=4k−3, 4k−2, 4k−1, 4k.

When the reference bit is a '0' then additional scan-lines are generated so that, along the vertical direction, a sequence of 4 contiguous picture elements equal to the binary sequence '0000' is generated for each reference bit. Thus if b(e,f,q)=0 is the reference bit, then $U^r\{b(r,f,q)\} = 0000$, where $r = 4k − 3, 4k − 2, 4k − 1, 4k$.

Similar to the horizontally expanding first stage decoder 35, once the first three top scan-lines are processed, the second stage decoder 36 receives two new lines at a time for each three-scan-line iteration. Subsequently, scan-lines are input in pairs with the last line of the previous set acting as the first line of the next until all input scan-line data is analyzed. The last scan-line in a file is finally repeated once in order to produce the correct number of scan-lines in the output image file. Thus, the second stage decoder 36, in effect, provides a 4-to-1 expansion of the compressed image data along the vertical dimension, so that the output file length is restored to the original normalized number of 2200 scan-lines.

Thus, the decoding or de-compressiong system 30 not only decodes the received image pixels to the original pre-coded number, but also does so in a manner that reduces the granularity of the output image, thus enhancing its subjective intelligibility and quality.

What we claim is:

1. An encoding system for compressing an original facsimile image, comprising:
   a first encoder, coupled to receive the facsimile image, for vertically compressing the original facsimile image, thereby providing a first vertically-compressed facsimile image; and
   a second encoder, coupled to receive an output of said first encoder, for vertically compressing the first vertically-compressed facsimile image from said first encoder, thereby providing a second vertically-compressed facsimile image;
   said first encoder vertically compressing the original facsimile image by selectively retaining scan lines thereof, and said second encoder vertically compressing the first vertically-compressed facsimile image provided by said first encoder by performing a logical OR operation on pairs of scan lines of the first vertically-compressed facsimile image.

2. The encoding system as defined in claim 1, wherein said second vertically-compressed facsimile image provided by said second encoder includes N number of scan lines, said first vertically-compressed facsimile image provided by said first encoder includes 2N number of scan lines, and wherein said original facsimile image includes 4N number of scan lines.

3. The encoding system as defined in claim 1, further comprising a third encoder, coupled to receive an output of said second encoder, for horizontally compressing the second vertically-compressed facsimile image, thereby providing a first vertically and horizontally compressed facsimile image, and a fourth encoder, coupled to receive an output of said third encoder, for horizontally compressing the first vertically and horizontally compressed facsimile image.

4. The encoding system as defined in claim 3, wherein said third encoder horizontally compresses the second vertically-compressed facsimile image by selectively retaining pixels from scan lines thereof, and wherein said fourth encoder horizontally compresses the first vertically and horizontally compressed facsimile image by performing a logical OR operation on pairs of pixels along each of the scan lines of said first vertically and horizontally compressed facsimile image.

5. A method of encoding an original facsimile image, comprising the steps of:
- a first step of vertically compressing the original facsimile image by selectively retaining scan lines thereof, thereby providing a first vertically-compressed facsimile image; and
- a second step of vertically compressing the first vertically-compressed facsimile image by performing a logical OR operation on pairs of scan lines of the first vertically-compressed facsimile image, thereby providing a second vertically-compressed facsimile image.

6. The method as defined in claim 5, wherein said second vertically-compressed facsimile image includes N number of scan lines, said first vertically-compressed facsimile image includes 2N number of scan lines, and wherein said original facsimile image includes 4N number of scan lines.

7. The method as defined in claim 5, further comprising a third step of horizontally compressing the second vertically-compressed facsimile image, thereby providing a first vertically and horizontally compressed facsimile image, and a fourth step of horizontally compressing the first vertically and horizontally compressed facsimile image.

8. The method as defined in claim 7, wherein said third step of horizontally compressing the second vertically-compressed facsimile image includes selectively retaining pixels from scan lines thereof, and wherein said fourth step of horizontally compressing the first vertically and horizontally compressed facsimile image includes performing a logical OR operation on pairs of pixels along each of the scan lines of said first vertically and horizontally compressed facsimile image.

9. A system for decoding an encoded facsimile image comprising:
- a first decoder, coupled to receive the encoded facsimile image; and
- a second decoder, coupled to receive an output of said first decoder;
- said first decoder decoding the encoded facsimile image by selecting a bit in the encoded facsimile image as a first reference bit, and horizontally expanding said first reference bit with a predetermined bit pattern in accordance with bit values near said reference bit, said second decoder decoding the facsimile image output from said first decoder by selecting a second reference bit therein, and vertically expanding said second reference bit with a predetermined bit pattern in accordance with bit values near said second second reference bit.

* * * * *